United States Patent [19]

Ichikawa et al.

[11] Patent Number: 5,360,079
[45] Date of Patent: Nov. 1, 1994

[54] FUEL INJECTED AUTOMOTIVE ENGINE

[75] Inventors: Ryuichi Ichikawa; Junichi Kaku; Takahiro Suzuki, Iwata, all of Japan

[73] Assignee: Yamaha Hatsudoki Kabushiki Kaisha, Iwata, Japan

[21] Appl. No.: 591,704

[22] Filed: Oct. 2, 1990

[30] Foreign Application Priority Data

Oct. 2, 1989 [JP] Japan .................................. 1-257460

[51] Int. Cl.$^5$ ................................................ B60K 5/04
[52] U.S. Cl. .................................. 180/297; 123/73 R; 123/468; 123/531; 180/68.1
[58] Field of Search .......... 180/68.1, 68.3, 291, 180/297; 123/469, 470, 468, 531, 533, 73 R

[56] References Cited

U.S. PATENT DOCUMENTS

| | | | |
|---|---|---|---|
| 1,589,982 | 6/1926 | Muller | 123/533 |
| 1,609,386 | 12/1926 | Streeter | 123/533 |
| 3,412,718 | 11/1968 | Long | 123/468 |
| 4,149,497 | 4/1979 | Zeliszkewycz | 123/533 |
| 4,461,260 | 7/1984 | Nonaka et al. | 123/73 R |
| 4,911,135 | 3/1990 | Nishimura et al. | 180/68.1 |

FOREIGN PATENT DOCUMENTS

| | | | |
|---|---|---|---|
| 318971 | 6/1989 | European Pat. Off. | 180/68.3 |
| 93623 | 4/1988 | Japan | 180/297 |

*Primary Examiner*—Eric Culbreth
*Attorney, Agent, or Firm*—Knobbe, Martens, Olson & Bear

[57] ABSTRACT

Two embodiments of motor vehicles powered by two cycle crankcase compression internal combustion engines having air fuel injectors. The air fuel injectors are mounted in the cylinder head but are disposed in such a position so that the fuel injector portion of the fuel air injector extends toward the high side of the hood to permit accessibility without sacrificing the use of a low hood line.

17 Claims, 4 Drawing Sheets

5,360,079

FUEL INJECTED AUTOMOTIVE ENGINE

BACKGROUND OF THE INVENTION

This invention relates to a fuel injected automotive engine and more particularly to an improved positioning for the fuel injectors of an automotive engine that permits the use of a low hood line and easy accessibility of the fuel injectors.

The advantages of providing fuel injection, particularly direct fuel injection, with engines and particularly two cycle engines is acknowledged. Where direct cylinder fuel injection is employed, the fuel injectors are normally mounted in the cylinder head along with certain other components such as the spark plug for firing the charge. It is also desirable to position the fuel injectors in such a manner that they may be easily accessible for servicing and other purposes. The same is, of course, true with respect to the spark plugs. Certain types of fuel injectors inject not only air, but also fuel into the engine. These injectors are more complicated than injectors which inject only fuel and require additional space because of their greater complexity.

The cylinder head mounting of fuel injectors and particularly air fuel injectors gives rise to certain problems when the injectors are used with automotive engines. It is well known that is desirable to provide a low hood line for a motor vehicle so as to provide good streamlining and better fuel efficiency. However, when the engine is mounted in the engine compartment with the fuel injectors projecting upwardly, this can give rise to the difficulty in providing low hood lines. These problems may be particularly acute in conjunction with transverse front wheel drive engine placements.

It is, therefore, a principal object of this invention to provide an improved fuel injector arrangement for a motor vehicle that permits access to the fuel injectors and a low hood line.

It is a still further object of this invention to provide an improved injection system for a motor vehicle wherein the injection system is mounted in a cylinder head, but in such a location as to not require a high hood line.

SUMMARY OF THE INVENTION

This invention is adapted to be embodied in a motor vehicle having an engine compartment and an engine positioned within the engine compartment with its output shaft axis extending transversely across the engine compartment. The engine compartment is defined by a sloping hood. The engine has a cylinder head juxtaposed to the hood and a fuel injector mounted in the cylinder head on the upper side thereof where the hood is the highest.

DETAILED DESCRIPTION OF THE PREFERRED EMBODIMENTS

Figure 1:
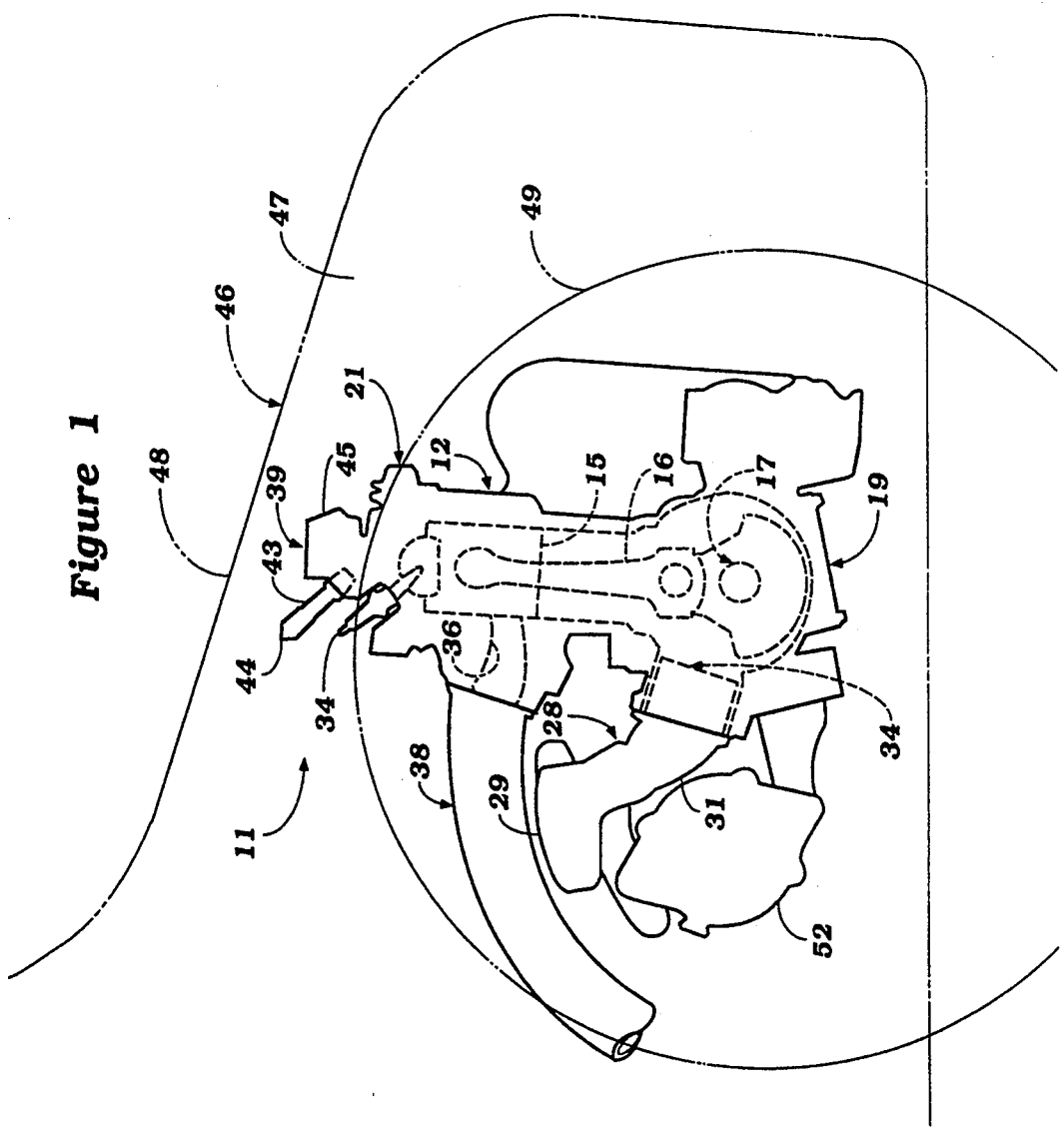
FIG. 1 is a side elevational view of the forward portion of a motor vehicle powered by an internal combustion engine constructed in accordance with an embodiment of this invention, with the components of the vehicle being shown in phantom.
Figure 2:
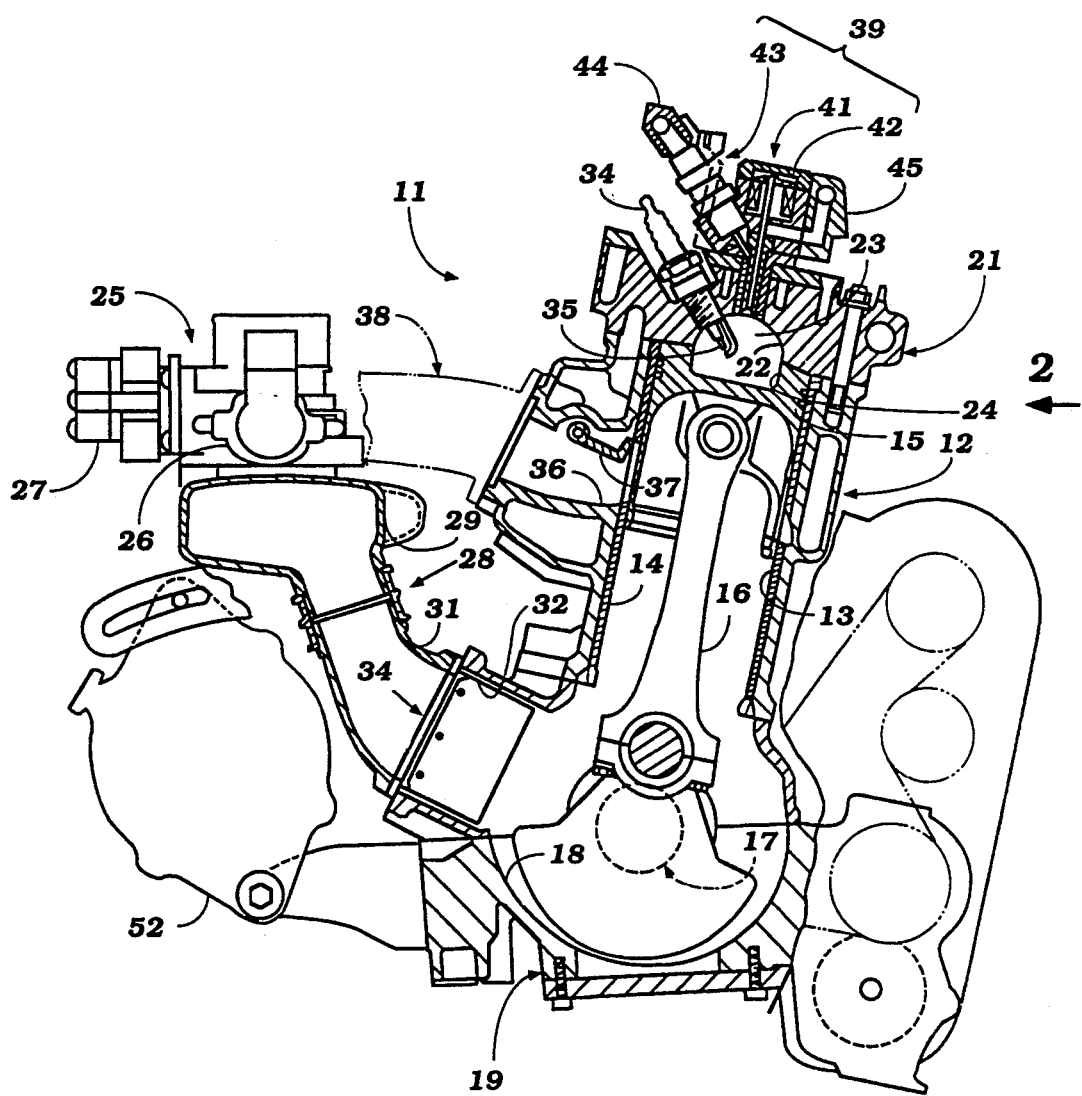
FIG. 2 is a cross sectional view taken through one cylinder of a multiple cylinder, two cycle, crankcase compression engine constructed in accordance with an embodiment of the invention.
Figure 3:
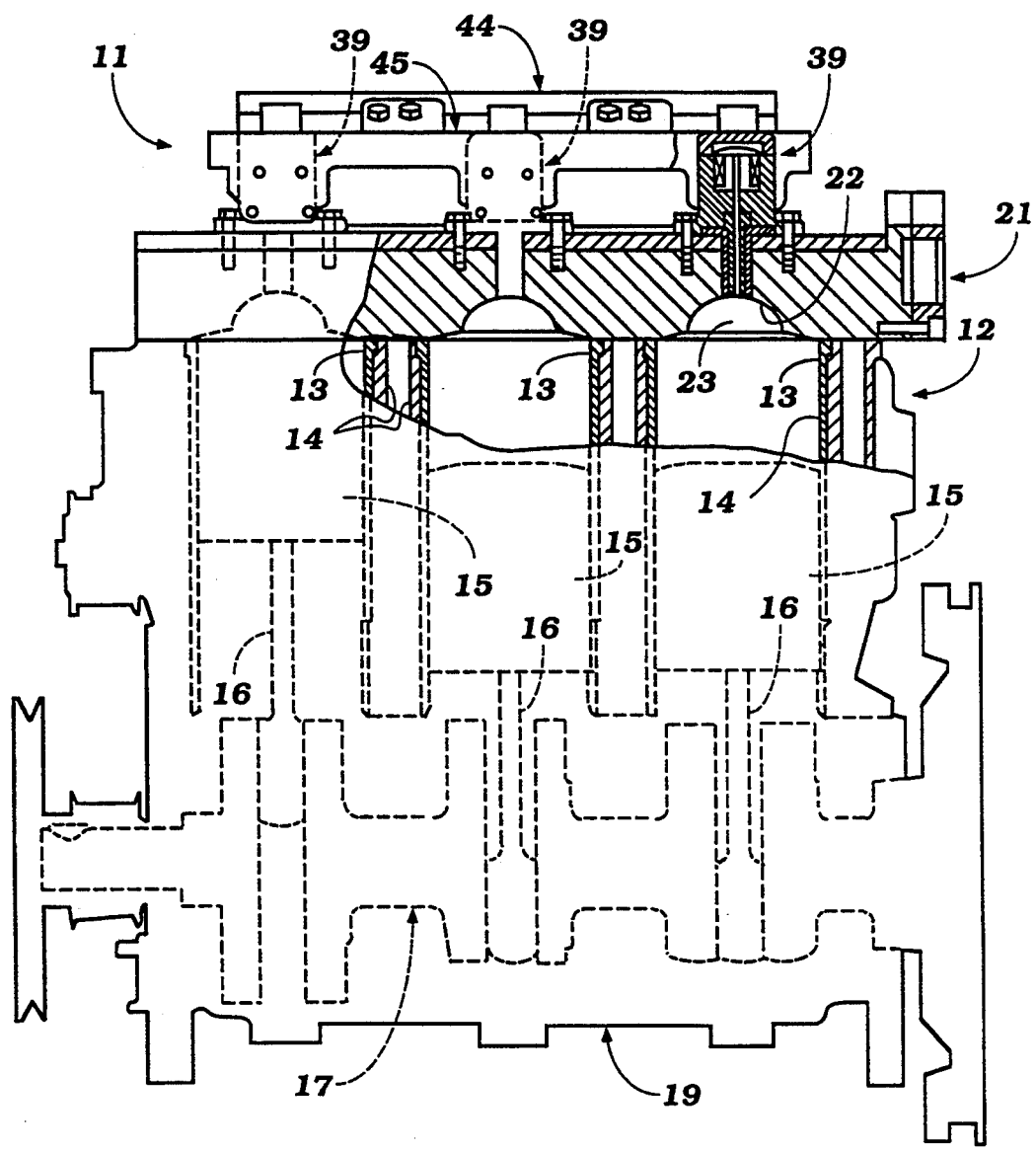
FIG. 3 is a side elevational view, with portions broken away, of the engine and looking generally in the direction of the arrow 3 in FIG. 2.

Referring now in detail to the drawings and initially primarily to FIGS. 1 through 3, a three cylinder, in line, two cycle, crankcase compression, automotive internal combustion engine constructed in accordance with a first embodiment of the invention is identified generally by the reference numeral 11. The engine 11 is, as noted, illustrated to be a three cylinder, in line type engine. It is to be understood, however, that the invention may be also employed in conjunction with engines having other numbers of cylinders and other cylinder orientations. In fact, certain features of the invention can be utilized in conjunction with rotary rather than reciprocating type engines and, in addition, some features of the invention may also be employed in engines operating on the four stroke rather than two stroke principle. The invention, however, has particular utility in conjunction with two stroke engines.

The engine 11 is comprised of a cylinder block assembly, indicated generally by the reference numeral 12, in which three aligned cylinder bores 13 are formed by cylinder liner 14 that are received within the cylinder block 12 in a known manner. Pistons 15 are supported for reciprocation within each of the cylinder bores 14 and are connected by means of respective connecting rods 16 to a crankshaft 17 that is journaled for rotation within a crankcase chamber 18 formed by the cylinder block 12 and a crankcase 19 in a known manner.

A cylinder head assembly 21 is affixed to the cylinder block 12 and has individual recesses 22 which cooperate with the piston 15 and cylinder bore 13 to form combustion chambers 23. The heads of the pistons 15 are provided with bowls 24 so as to further form these combustion chambers 23.

An air charge is delivered to the crankcase chambers 18 associated with each of the cylinder bores 13 by an induction system that includes a throttle body, indicated generally by the reference numeral 25, that receives air from an air cleaner (not shown). This throttle body 25 includes a throttle valve (not shown) which is manually operated and the position of which is sensed by a potentiometer 26 to provide a throttle valve position signal for controlling the fuel injection system to be described. In addition, a sub injector 27 may be provided in the throttle body 25 so as to inject additional fuel under certain running conditions.

The throttle body 25 delivers the air to an induction system, indicated generally by the reference numeral 28, and which includes a plenum chamber 29. The plenum chamber supplies air through manifolds 31 to inlet ports 32 associated with each crankcase chamber 18. These crankcase chambers 18 are sealed from each other, as is typical with two cycle engine practice. A reed type check valve 33 is positioned in each inlet port 32 so as to prevent reverse flow when the charge is being compressed in the crankcase chambers 18 by downward movement of the pistons 15.

The compressed charge is transferred to the combustion chambers 23 through suitable scavenge passages (not shown). This charge is then further compressed in the combustion chambers 23 by the upward movement of the pistons 15 and is fired by a spark plug 34 mounted in the cylinder head 21 with its gap 35 extending into the combustion chamber 23.

The burnt charge is then discharged from the combustion chambers 23 through exhaust ports 36 in which exhaust control valves 37 are provided. The exhaust control valves 37 are operated so as to provide a reduced compression ratio under high speed, high load operating conditions in a suitable manner. The exhaust gases are then discharged to the atmosphere through an exhaust system which includes an exhaust manifold 38.

The fuel charge for the combustion and an additional air charge is supplied by injector units 39 which may be of any known type and which serve to inject both fuel and a compressed air charge into the combustion chambers 23. The injector units 39 include a main housing assembly 41 in which a solenoid assembly 42 is provided for operating an injector valve to control the admission of fuel and air into the combustion chambers 23. This injector valve is disposed so that its axis lies substantially on the axis of the cylinder bores 13 and is positioned at the top of the cylinder head 21.

Fuel is supplied to the injector units 39 by individual fuel injector nozzles 43 which are mounted in the housing assembly 41 at a 45° angle extending rearwardly toward the intake and exhaust side of the engine in this embodiment and positioned above the spark plugs 34. The reason for this angular relationship will be described later. A fuel manifold 44 is affixed to the tips of the injector nozzles 43 and supplies fuel to them.

An air manifold 45 is affixed to the front side of the housings 41 and supplies the compressed air to the injectors 39. The air manifold 45 is affixed to each of the injectors 39. Thus the injectors 39 and air manifold 45 form a sub assembly that may be conveniently installed and removed from the engine.

It should be readily apparent that the rearward positioning of the fuel injectors 43 and the spark plugs 34 permits these elements to be positioned so that they can be easily accessed for servicing. However, this rearward placement also permits the use of a sloping hood line when the engine 21 is installed in a motor vehicle in a transverse direction as shown in FIG. 1. In this figure, the motor vehicle is shown in phantom and is identified generally by the reference numeral 46. The motor vehicle 46 includes an engine compartment 47 that is defined at its upper extremity by a downwardly sloping hood 48. The engine 21 is positioned transversely in the engine compartment 47 so that the axis of rotation of the crankshaft 17 extends transversely to the engine compartment. This permits the engine 21 to conveniently drive the front wheels 49 of the motor vehicle 46 in a suitable manner.

As may be readily seen from FIG. 1, the rearward placement of the fuel injectors 43 and their 45° angle to the vertical axis permits the engine 21 to be installed in a generally upright manner and without requiring a raised hood line. Also, the rearward and upper placement of the fuel injectors 43 and the injectors 39 permits ease of servicing. It should be also be noted that the fuel rail 44 is disposed at an elevated position above the main injectors 39 so that cooling air flowing through the engine compartment 47 from the grille opening at the front of it can easily cool the fuel system. In addition, the air manifold 45 is forwardly located and in the path of air flow so it also will be cooled. Again, these results are achieved without raising the hood line in any manner.

The crankshaft 17 drives a plurality of accessories 51 (FIG. 2) through a belt or chain drive mechanism located at the forward end of the engine. In addition, an alternator or generator 52 may be mounted to the rear of the engine and driven from the crankshaft 17 in a known manner.

Figure 4:
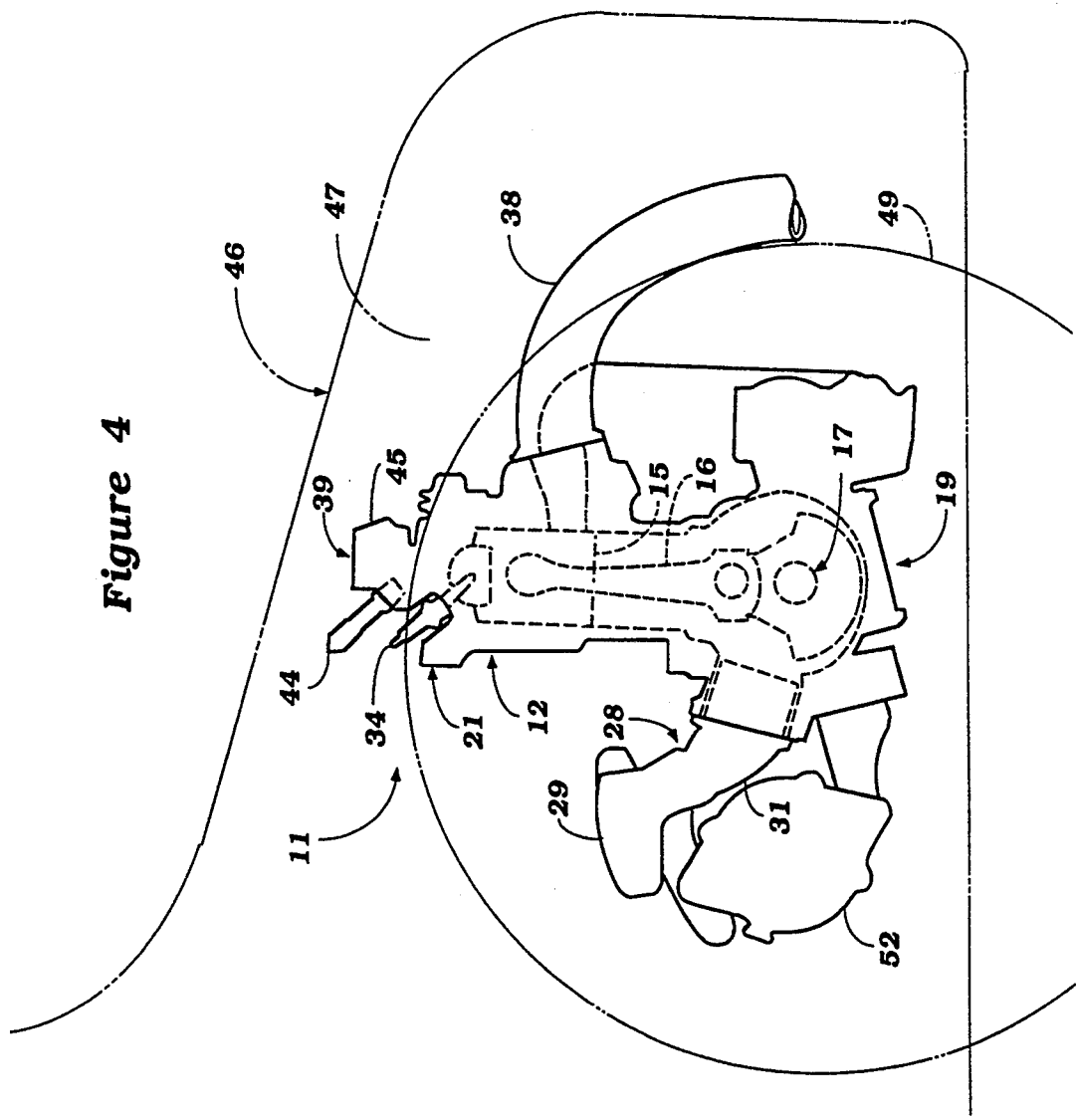
FIG. 4 is a side elevational view, in part similar to FIG. 1, and shows another embodiment of the invention.

FIG. 4 shows another embodiment of the invention which is generally the same as FIGS. 1 through 3. For that reason, components which are the same have been identified by the same reference numerals and will not be described again in detail. However, in this embodiment, the exhaust manifold, rather than extending rearwardly from the engine, extends forwardly from it. This will permit it to be better cooled and will avoid heating of the induction air from the exhaust manifold. In all other regards, this embodiment is the same as the previously described embodiment and thus partakes of its advantages.

It should be readily apparent from the foregoing description that the described embodiments of the invention are highly effective in providing an injection system for an engine that can be easily serviced and yet which also will not interfere with the provision of a low hood line, even when the associated engine is installed in an upright position in the engine compartment.

Of course, the foregoing description is that of preferred embodiments of the invention. Various changes and modifications may be made without departing from the spirit and scope of the invention, as defined by the appended claims.

We claim:

1. In a motor vehicle having an engine compartment, an engine positioned in said engine compartment, said engine having an output shaft rotating about an axis extending transversely across said engine compartment, said engine compartment being defined in part by a downwardly sloping hood, said engine having a cylinder head juxtaposed to said hood, the vertical distance between one side of said cylinder head and said hood being less than the vertical distance between said hood and the other side of said cylinder head, and a plurality of fuel injectors mounted on said other side of said cylinder head, the area between said hood and said fuel injectors being generally open for free access to said fuel injectors when said hood is opened.

2. In a motor vehicle as set forth in claim 1 wherein the fuel injectors are positioned above spark plugs mounted in the cylinder head for firing the charge in the combustion chambers.

3. In a motor vehicle as set forth in claim 1 wherein the fuel injectors comprise a portion of fuel air injectors which inject both air and fuel into respective combustion chambers through the cylinder head.

4. In a motor vehicle as set forth in claim 3 wherein the fuel air injectors have spray axes aligned with a respective axis of a respective cylinder bore forming in part the respective combustion chamber.

5. In a motor vehicle as set forth in claim 4 wherein the fuel injectors are mounted at an acute angle to the respective injector axis and extends therefrom toward the high side of the hood.

6. In a motor vehicle as set forth in claim 5 wherein the engine is positioned in a generally vertical orientation in the engine compartment.

7. A motor vehicle as set forth in claim 5 wherein the engine is a two cycle crankcase compression internal combustion engine.

8. In a motor vehicle as set forth in claim 5 wherein the fuel injectors are positioned above spark plugs mounted in the cylinder head for firing the charge in the respective combustion chamber.

9. A motor vehicle as set forth in claim 8 wherein the engine is a two cycle crankcase compression internal combustion engine.

10. In a motor vehicle as set forth in claim 8 wherein the engine is positioned in a generally vertical orientation in the engine compartment.

11. A motor vehicle as set forth in claim 10 wherein the engine is a two cycle crankcase compression internal combustion engine.

12. In a motor vehicle as set forth in claim 1 wherein the engine has an exhaust manifold that extends rearwardly from the engine relative to the engine compartment.

13. In a motor vehicle as set forth in claim 1 wherein the engine has an exhaust manifold that extends forwardly from the engine within the engine compartment.

14. In a motor vehicle as set forth in claim 1 wherein fuel is supplied to the fuel injectors through a fuel rail that is disposed in the path of air flow through the engine compartment.

15. In a motor vehicle as set forth in claim 14 wherein the fuel injectors comprises portions of respective fuel air injectors which inject both air and fuel into the respective combustion chamber through the cylinder head.

16. In a motor vehicle as set forth in claim 15 wherein air is supplied to the air fuel injectors by an air manifold that is disposed in the path of air flow through the engine compartment.

17. A motor vehicle as set forth in claim 1 wherein the engine is a two cycle crankcase compression internal combustion engine.

* * * * *